United States Patent
Alston et al.

(10) Patent No.: US 11,254,571 B1
(45) Date of Patent: Feb. 22, 2022

(54) PURIFICATION AND ENRICHMENT OF BORON NITRIDE NANOTUBE FEEDSTOCKS

(71) Applicant: Government of the United States, as represented by the Secretary of the Air Force, Wright-Patterson AFB, OH (US)

(72) Inventors: Jeffrey R. Alston, High Point, NC (US); Jason T. Lamb, Huntersville, NC (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 237 days.

(21) Appl. No.: 16/245,821

(22) Filed: Jan. 11, 2019

(51) Int. Cl.
*C01B 21/064* (2006.01)
*B01D 11/02* (2006.01)
*B01D 71/36* (2006.01)

(52) U.S. Cl.
CPC ...... *C01B 21/0648* (2013.01); *B01D 11/0265* (2013.01); *B01D 71/36* (2013.01); *B01D 2325/02* (2013.01); *C01P 2004/13* (2013.01)

(58) Field of Classification Search
None
See application file for complete search history.

(56) References Cited

U.S. PATENT DOCUMENTS

| | | | |
|---|---|---|---|
| 4,253,962 A | 3/1981 | Thompson | |
| 5,919,376 A | 7/1999 | Carman | |
| 6,221,255 B1 | 4/2001 | Vadoothker | |
| 7,008,540 B1 | 3/2006 | Weavers et al. | |
| 8,703,023 B2 | 4/2014 | Sainsbury et al. | |

(Continued)

FOREIGN PATENT DOCUMENTS

| | | | |
|---|---|---|---|
| CN | 101580235 B | 5/2011 | |
| CN | 103536645 A | 1/2014 | |

(Continued)

OTHER PUBLICATIONS

Xu et al. (Liquid-Phase Exfoliation of Hexagonal Boron Nitride into Boron Nitride Nanosheets in Common Organic Solvents with Hyperbranched Polyuethylene as Stabilizer; Macromol. Chem. Phys.; 1700482, 219 (Year: 2018).*

(Continued)

*Primary Examiner* — Guinever S Gregorio
(74) *Attorney, Agent, or Firm* — AFMCLO/JAZ; Timothy Barlow

(57) ABSTRACT

A method for purifying a boron nitride nanotube feedstock is disclosed, including an initial step of mixing a boron nitride nanotube (BNNT) feedstock with a solvent to form an initial mixture. This BNNT feedstock is made up of hexagonal boron nitride (h-BN) particles and less than about 50 weight percent BNNTs on a dry basis. This initial mixture is then sonicated within a treatment vessel using an ultrasonic probe. At least a portion of the initial mixture is filtered out of the treatment vessel and across a nanoporous membrane at the same as the sonication. In this manner, the method provides a filtrate which is enriched in h-BN particles relative to the initial mixture and a retentate which is enriched in BNNTs relative to the initial mixture.

10 Claims, 2 Drawing Sheets

(56) References Cited

U.S. PATENT DOCUMENTS

| | | |
|---|---|---|
| 8,734,748 B1 | 5/2014 | Hung et al. |
| 8,871,295 B2 | 10/2014 | Brown et al. |
| 9,862,604 B2 | 1/2018 | Kim et al. |
| 2003/0234174 A1 | 12/2003 | Kinoshita et al. |
| 2004/0016699 A1 | 1/2004 | Bayevsky |
| 2005/0023219 A1 | 2/2005 | Kirker et al. |
| 2006/0063392 A1 | 3/2006 | Ventzek et al. |
| 2011/0186785 A1 | 8/2011 | Kato et al. |
| 2011/0192016 A1 | 8/2011 | Kang et al. |
| 2017/0275742 A1 | 9/2017 | Ganor |
| 2019/0292052 A1* | 9/2019 | Dushatinski .......... C04B 35/583 |
| 2021/0316990 A1* | 10/2021 | Okai ...................... C22C 21/00 |

FOREIGN PATENT DOCUMENTS

| | | | |
|---|---|---|---|
| WO | 2013037019 A1 | 3/2013 | |
| WO | WO-2019079882 A1 * | 5/2019 | ............. C03C 25/16 |

OTHER PUBLICATIONS

Fay et al.; Thermodynamic Approach to Boron Nitride Nanotube Solubility and Dispersion; Nanoscale, 8, pp. 4348-4359; 2016.*

* cited by examiner

PURIFICATION AND ENRICHMENT OF BORON NITRIDE NANOTUBE FEEDSTOCKS

GOVERNMENT INTEREST

The invention described herein may be manufactured, used, and licensed by or for the Government of the United States for all governmental purposes without the payment of any royalty.

FIELD OF THE INVENTION

The present disclosure relates to the field of nanomaterials, and more specifically to a method for purifying a boron nitride nanotube feedstock.

BACKGROUND OF THE INVENTION

Boron nitride nanotubes (BNNTs) are a relatively new category of nanomaterials which are of both commercial and research interest. To date, methods for the preparation of BNNTs have generally fallen into two broad categories: (1) methods which produce small quantities of relatively high purity BNNTs and (2) methods which produce larger quantities of BNNTs, but with a lower BNNT purity (i.e. more impurities are included with the BNNTs in the final product mixture). Such high quantity, low purity methods typically provide a BNNT feedstock which is made up of 50 weight percent BNNTs or less. The remainder of the BNNT feedstock is made up of undesirable side products. In many instances, the feedstock may include 20 weight percent or more of hexagonal boron nitride (h-BN), with amorphous boron and boron nitride derivatives making up the balance of the mixture. Neither method has thus far proven to satisfactorily provide large quantities of relatively high purity BNNTs at a commercially reasonable price point.

Thus, there is a continuing need for novel methods and systems for providing large quantities of relatively high purity BNNTs, and preferably at a lower price point.

SUMMARY OF THE INVENTION

In response to these issues, the present disclosure provides, in a first aspect, a method for purifying a boron nitride nanotube feedstock. In accordance with one embodiment of the present disclosure, this method includes an initial step of mixing a boron nitride nanotube (BNNT) feedstock with a solvent to form an initial mixture. This BNNT feedstock is made up of hexagonal boron nitride (h-BN) particles and less than about 50 weight percent BNNTs on a dry basis. According to the method, this initial mixture is then sonicated within a treatment vessel using an ultrasonic probe. The method also includes a step of filtering at least a portion of the initial mixture out of the treatment vessel and across a nanoporous membrane at the same time as the sonication. In this manner, the method provides a filtrate which is enriched in h-BN particles relative to the initial mixture and a retentate which is enriched in BNNTs relative to the initial mixture.

In certain embodiments, the solvent is made up of at least one polar aprotic solvent. Further, in some embodiments, the solvent is more particularly made up of a mixture of at least two solvents selected from the group consisting of tetrahydrofuran (THF), N-methyl-2-pyrrolidone (NMP), N,N'-dimethylformamide (DMF), acetone, N,N'-dimethylacetamide (DMAc), dimethylsulfoxide (DMSO), dichloromethane (DCM), toluene, isopropanol, ethanol, and hexane. In some instances, the solvent is made up of a mixture of dimethylformamide and acetone.

In some embodiments, the initial mixture may also include a non-metal containing surfactant.

In certain embodiments, the retentate is made up of at least 90 weight percent BNNTs on a dry basis. In some instances, the retentate is made up of at least 98 weight percent BNNTs on a dry basis.

According to some embodiments, the nanoporous membrane is made up of polytetrafluoroethylene (PTFE). Further, in certain embodiments, the nanoporous membrane includes a plurality of pores, with these pores having an average pore size from about 0.1 µm to about 100 µm.

In some embodiments, a sub-atmospheric pressure is established across the membrane in order to draw filtrate across the membrane.

According to some embodiments, the method includes a further step of adding makeup solvent to the mixture during the filtering step so that the volume of the mixture in the treatment vessel remains substantially constant.

In a second aspect, the present disclosure provides a system for purifying a boron nitride nanotube feedstock. In accordance with one embodiment of the present disclosure, this system includes a treatment vessel having an interior volume for receiving an initial mixture of a boron nitride nanotube (BNNT) feedstock with a solvent. This BNNT feedstock is made up of hexagonal boron nitride (h-BN) particles and less than about 50 weight percent BNNTs on a dry basis. According to the present disclosure, the system also includes a nanoporous membrane in flow communication with the treatment vessel's interior volume; and an ultrasonic mixing probe disposed within the treatment vessel's interior volume. In accordance with the present disclosure, an initial mixture of a boron nitride nanotube (BNNT) feedstock with a solvent is sonicated within the treatment vessel interior volume while, at the same time, at least a portion of the mixture is filtered across the nanoporous membrane and out of the treatment vessel to provide a filtrate.

In some embodiments, the initial mixture may also include a non-metal containing surfactant.

According to some embodiments, the retentate is made up of at least 90 weight percent BNNTs on a dry basis. In some instances, the retentate is made up of at least 98 weight percent BNNTs on a dry basis.

In some embodiments, the solvent is made up of at least one polar aprotic solvent.

In certain embodiments, the nanoporous membrane is made up of polytetrafluoroethylene (PTFE). Further, in certain embodiments, the nanoporous membrane includes a plurality of pores, with these pores having an average pore size from about 0.1 µm to about 100 µm.

According to some embodiments, the system may also include a receiving vessel for collecting filtrate from the nanoporous membrane and this receiving vessel may be maintained at a sub-atmospheric pressure in order to draw filtrate across the membrane.

In certain embodiments, the system may also include a solvent supply reservoir and a solvent supply line for adding makeup solvent to the mixture in the treatment vessel.

In a further aspect, the present disclosure provides method for suspending a boron nitride nanotube feedstock. In accordance with one embodiment of the present, this method includes an initial step of mixing a boron nitride nanotube (BNNT) feedstock with a solvent to form an initial mixture. This BNNT feedstock is made up of hexagonal boron nitride (h-BN) particles and less than about 50 weight percent BNNTs on a dry basis. According to the method, this initial mixture is then sonicated within a treatment vessel using an ultrasonic probe to suspend the BNNTs.

In accordance with certain embodiments, the solvent is made up of at least one polar aprotic solvent. Further, in some embodiments, the solvent is more particularly made up of a mixture of at least two solvents selected from the group consisting of tetrahydrofuran (THF), N-methyl-2-pyrrolidone (NMP), N,N'-dimethylformamide (DMF), acetone, N,N'-dimethylacetamide (DMAc), dimethylsulfoxide (DMSO), dichloromethane (DCM), toluene, isopropanol, ethanol, and hexane. In some instances, the solvent is made up of a mixture of dimethylformamide and acetone.

According to some embodiments, the initial mixture may also include a non-metal containing surfactant.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION OF THE INVENTION

In one aspect, the present disclosure provides a method for purifying a boron nitride nanotube feedstock. In general, this method includes: (1) mixing a boron nitride nanotube (BNNT) feedstock with a solvent, (2) sonicating this mixture within a treatment vessel, and (3) filtering at least a portion of this mixture out of the treatment vessel and across a nanoporous membrane at the same time as the sonication. Thus, a filtrate is provided which is enriched in hexagonal boron nitride (h-BN) particles relative to the initial mixture, and a retentate is provided which is enriched in BNNTs relative to the initial mixture.

Figure 1:
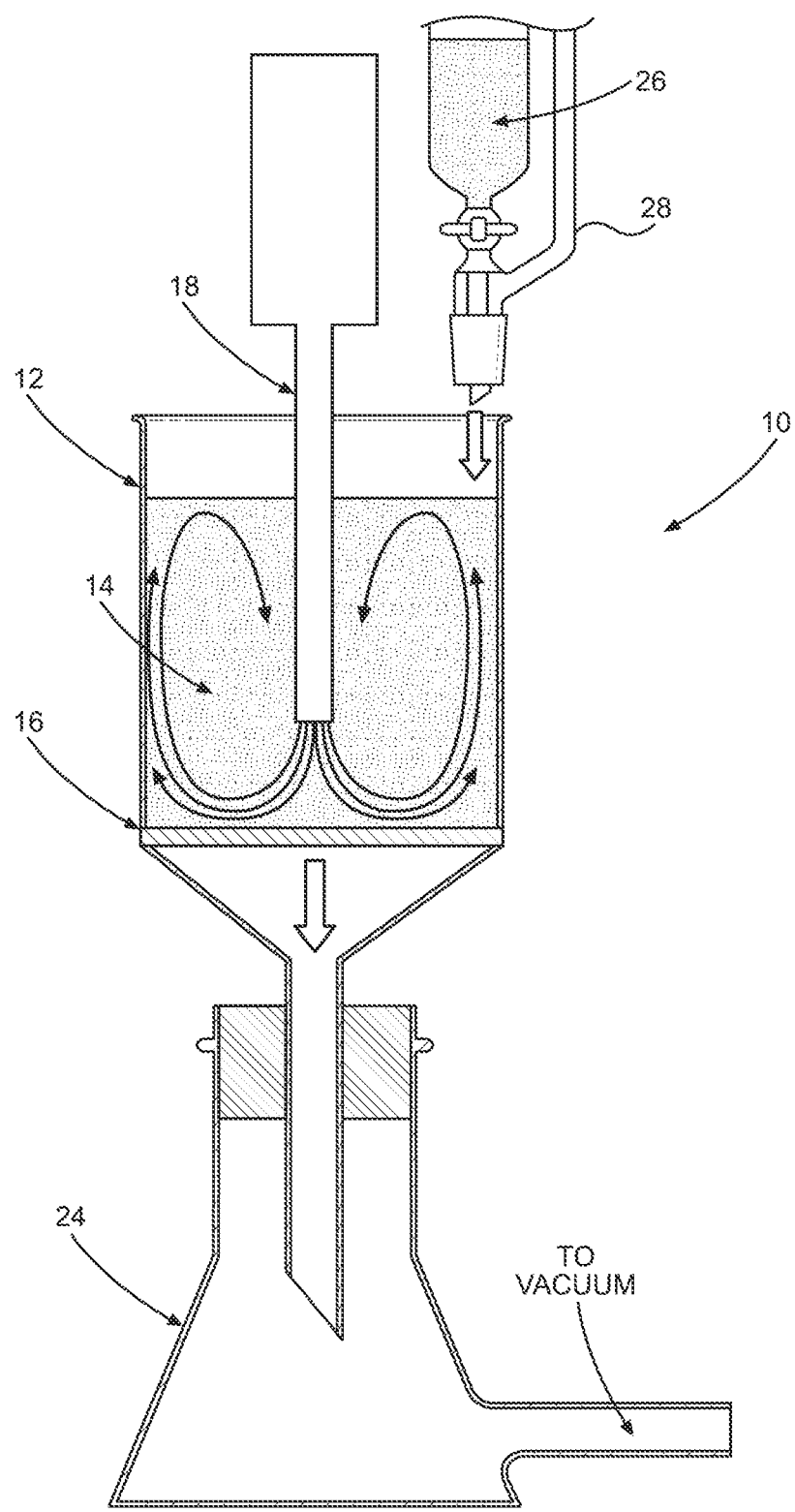
FIG. 1. is a diagram of an apparatus for use in purifying a boron nitride nanotube feedstock according to one embodiment of the present disclosure.

In a second aspect, the present disclosure also provides a system 10 for purifying a BNNT feedstock. As illustrated in FIG. 1, this system 10 includes a treatment vessel 12 having an interior volume for receiving an initial mixture 14 of a BNNT feedstock with a solvent. This BNNT feedstock is made up of hexagonal boron nitride (h-BN) particles and less than about 50 weight percent BNNTs on a dry basis. According to the present disclosure, the system 10 also includes a nanoporous membrane 16 in flow communication with the interior volume of the treatment vessel 12; and an ultrasonic mixing probe 18 disposed within the treatment vessel interior volume. In accordance with the present disclosure, the initial mixture 14 of a boron nitride nanotube (BNNT) feedstock with a solvent is sonicated within the treatment vessel interior volume while, at the same time, at least a portion of the mixture 14 is filtered across the nanoporous membrane 16 and out of the treatment vessel 12 to provide a filtrate.

In the first step of the aforementioned method, a BNNT feedstock is combined with a solvent to provide an initial mixture 14 in the interior volume of the treatment vessel 12.

This BNNT feedstock typically has a relatively low initial purity. Generally, the composition of the initial BNNT feedstock includes less than about 50 weight percent BNNT. The remainder of the BNNT feedstock is made up of undesirable side products. In many instances, the feedstock may include 20 weight percent or more of hexagonal boron nitride (h-BN), with amorphous boron and boron nitride derivatives making up the balance of the mixture 14.

The solvent for the initial mixture 14 typically is made up of at least one polar aprotic solvent. In some embodiments, this solvent is more particularly a mixture of at least two solvents selected from the group consisting of tetrahydrofuran (THF), N-methyl-2-pyrrolidone (NMP), N,N'-dimethylformamide (DMF), acetone, N,N'-dimethylacetamide (DMAc), dimethylsulfoxide (DMSO), dichloromethane (DCM), toluene, isopropanol, ethanol, and hexane. In some instances, the solvent is made up of a mixture of dimethylformamide and acetone.

In some embodiments, the initial mixture 14 may also include a surfactant to improve dispersion of the BNNTs in the solvent. This surfactant is generally a non-metal containing surfactant. Examples of suitable surfactants include sorbitan esters (Spans), polyoyxethylene sorbitan esters (Tweens), and alkylaryl polyether alcohols. In some instances, protein-based stabilizers or DNA or RNA based stabilizer may also be used as a dispersant. For instance, phospholipids, lecithin (from eggs), or ranasmurfin (frog protein) may be used as a dispersant in certain embodiments.

The initial mixture 14 is then ultrasonically sonicated in a treatment vessel 12. The treatment vessel 12 may be the same as that in which the initial mixture 14 was originally prepared, or the mixture 14 may be transferred to a different vessel 12.

The sonication is accomplished by inserting an ultrasonic probe 18 into the mixture 14, which vibrates at an ultrasonic frequency in excess of about 20,000 Hertz, and generally from about 20,000 to about 40,000 Hertz. This vibrational energy is transferred to the mixture 14 within the treatment vessel 12 and acts to disperse and suspend the BNNTs and other particles within the solvent.

According to the present disclosure, at least a portion of the initial mixture 14 is filtered out of the treatment vessel 12 at the same as the mixture 14 is being sonicated. In this regard, a lower portion of the treatment vessel 12 includes a nanoporous membrane 16 in flow communication with the treatment vessel 12 interior volume, and this nanoporous membrane 16 includes a plurality of pores. A portion of the mixture 14 passes across this nanoporous membrane 16 (i.e. through the pores) as it is filtered out of the treatment vessel 12.

In some instances, these pores may have an average pore size from about 0.1 μm to about 100 μm. Further, the nanoporous membrane 16 is typically formed from a polymeric material. According to some embodiments, the nanoporous membrane 16 may for instance be made up of polytetrafluoroethylene (PTFE).

In this manner, the portion of the initial mixture 14 which passes through the nanoporous membrane 16 may be collected as a filtrate, with the remaining portion of the mixture 14 left in the treatment vessel 12 being a corresponding retentate. According to the present disclosure, the composition of the filtrate is enriched in h-BN particles relative to the initial mixture 14, while the composition of the retentate is enriched in BNNTs relative to the initial mixture 14.

Again, the initial mixture 14 will typically be made up of less than about 50 weight percent BNNTs on a dry basis. After sonication and filtration, however, the final retentate may in some instances be made up of at least 90 weight percent BNNTs on a dry basis. In some instances, the retentate is made up of at least 98 weight percent BNNTs on a dry basis.

Figure 2:
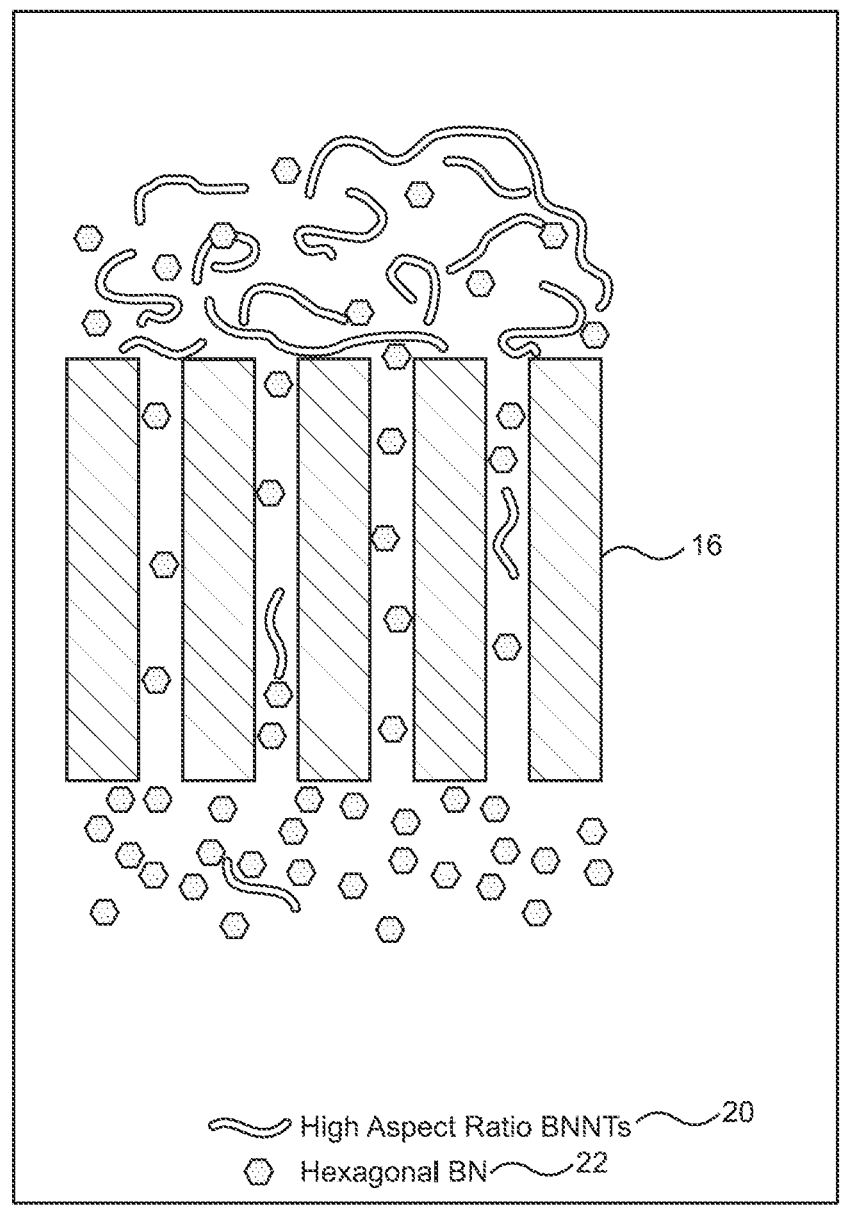
FIG. 2 is a diagram of membrane for use in purifying a boron nitride nanotube feedstock according to one embodiment of the present disclosure.

Without being bound by theory, it is believed that the BNNTs are longer particles than the h-BN particles and other impurities. Thus, the BNNT particles 20 have a relatively higher aspect ratio, while the h-BN particles 22 have a relatively lower aspect ratio, as illustrated diagrammatically in FIG. 2. Thus, it is believed that the h-BN particles 22 more easily pass through the nanopores of the membrane 16, as compared to the high aspect ratio BNNT particles 20. Consequently, after filtration, the filtrate is enriched in h-BN particles and depleted in BNNTs relative to the initial mixture 14, while the retentate is enriched in BNNTs and depleted in h-BN particles relative to the initial mixture 14.

Additionally, in some embodiments, a sub-atmospheric (i.e., vacuum) pressure may be established across the membrane 16 in order to draw filtrate across the membrane 16 and out of the treatment vessel 12 at a faster rate. Referring back to FIG. 1, the system 10 may also include a receiving vessel 24 for collecting filtrate from the nanoporous membrane 16 and this receiving vessel 24 may be maintained at a sub-atmospheric pressure in order to draw filtrate across the membrane 16.

Moreover, according to some embodiments, the method may also include a further step of adding makeup solvent to the mixture 14 during the filtering step. For instance, the system 10 may also include a solvent supply reservoir 26 and a solvent supply line 28 for adding makeup solvent to the mixture 14 in the treatment vessel 12. In certain embodiments the makeup solvent is added at a rate such that the volume of the mixture 14 in the treatment vessel 12 remains substantially constant. More particularly, in certain embodiments the makeup solvent is added at a rate such that the volume of the mixture 14 in the treatment vessel 12 remains within +/−10% of the initial mixture 14 volume during the filtering step.

In a further aspect, the present disclosure provides a method for suspending a boron nitride nanotube feedstock. In accordance with one embodiment of the present, this method includes an initial step of mixing a BNNT feedstock with a solvent to form an initial mixture 14, as described above. This BNNT feedstock is made up of hexagonal boron nitride (h-BN) particles and less than about 50 weight percent BNNTs on a dry basis. According to the method, this initial mixture 14 is then sonicated within a treatment vessel 12 using an ultrasonic probe 18 to suspend the BNNTs.

Suitable solvents for use in this method are generally the same as those described above. Typically, the solvent is made up of at least one polar aprotic solvent. For instance, the solvent may be made up of a mixture of at least two solvents selected from the group consisting of are tetrahydrofuran (THF), N-methyl-2-pyrrolidone (NMP), N,N'-dimethylformamide (DMF), acetone, N,N'-dimethylacetamide (DMAc), dimethylsulfoxide (DMSO), dichloromethane (DCM), toluene, isopropanol, ethanol, and hexane. In some instances, the solvent is made up of a mixture of dimethylformamide and acetone. The initial mixture may also include a non-metal containing surfactant.

As used herein and in the appended claims, the singular forms "a", "an" and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

While the present invention has been illustrated by the description of one or more embodiments thereof, and while the embodiments have been described in considerable detail, they are not intended to restrict or in any way limit the scope of the appended claim to such detail. Additional advantages and modification will be readily apparent to those skilled in the art. The invention in its broader aspects is therefore not limited to the specific details, representative compositions, and methods and illustrative examples shown and described. Accordingly, departures may be made from such details without departing from the scope or the spirit of the general inventive concept exemplified herein.

What is claimed is:

1. A method for purifying a boron nitride nanotube feedstock, the method comprising the steps of:
   mixing a boron nitride nanotube (BNNT) feedstock with a solvent to form an initial mixture, the BNNT feedstock comprising hexagonal boron nitride (h-BN) particles and more than 1 weight percent and less than about 50 weight percent BNNTs on a dry basis, wherein the solvent comprises a mixture of at least two solvents selected from the group consisting of are tetrahydrofuran (THF), N-methyl-2-pyrrolidone (NMP), N,N'-dimethylformamide (DMF), acetone, N,N'-dimethylacetamide (DMAc), dimethylsulfoxide (DMSO), dichloromethane (DCM), toluene, isopropanol, ethanol, and hexane, wherein the initial mixture further comprises a non-metal containing surfactant;
   sonicating the initial mixture within a treatment vessel using an ultrasonic probe; and
   filtering at least a portion of the initial mixture out of the treatment vessel and across a porous membrane at the same time as the sonication, so as to provide a filtrate which is enriched in h-BN particles relative to the initial mixture and a retentate which is enriched in BNNTs relative to the initial mixture.

2. The method of claim 1, wherein the retentate comprises at least 90 weight percent BNNTs on a dry basis.

3. The method of claim 1, wherein the porous membrane comprises polytetrafluoroethylene.

4. The method of claim 1, wherein the porous membrane comprises a plurality of pores, the pores having an average pore size from about 0.1 µm to about 100 µm.

5. The method of claim 1, wherein a sub-atmospheric pressure is established across the membrane in order to draw filtrate across the membrane.

6. The method of claim 1, further comprising the step of adding makeup solvent to the mixture during the filtering step so that the volume of the mixture in the treatment vessel remains substantially constant.

7. A method for suspending a boron nitride nanotube feedstock, the method comprising
the steps of:
   mixing a boron nitride nanotube (BNNT) feedstock with a solvent to form an initial mixture, the BNNT feedstock comprising hexagonal boron nitride (h-BN) particles and more than 1 weight percent and less than about 50 weight percent BNNTs on a dry basis, wherein the solvent comprises a mixture of at least two solvents selected from the group consisting of are tetrahydrofuran (THF), N-methyl-2-pyrrolidone (NMP), N,N'-dimethylformamide (DMF), acetone, N,N'-dimethylacetamide (DMAc), dimethylsulfoxide (DMSO), dichloromethane (DCM), toluene, isopropanol, ethanol, and hexane, wherein the initial mixture further comprises a non-metal containing surfactant; and sonicating the initial mixture within a treatment vessel using an ultrasonic probe.

8. The method of claim 7, wherein the solvent comprises at least one polar aprotic solvent.

9. A method for purifying a boron nitride nanotube feedstock, the method comprising the steps of:

mixing a boron nitride nanotube (BNNT) feedstock with a solvent to form an initial mixture, the BNNT feedstock comprising hexagonal boron nitride (h-BN) particles and more than 1 weight percent and less than about 50 weight percent BNNTs on a dry basis, wherein the solvent comprises a mixture of at least two solvents selected from the group consisting of are tetrahydrofuran (THF), N-methyl-2-pyrrolidone (NMP), N,N'-dimethylformamide (DMF), acetone, N,N'-dimethylacetamide (DMAc), dimethylsulfoxide (DMSO), dichloromethane (DCM), toluene, isopropanol, ethanol, and hexane;

sonicating the initial mixture within a treatment vessel using an ultrasonic probe; and filtering at least a portion of the initial mixture out of the treatment vessel and across a porous membrane at the same time as the sonication, so as to provide a filtrate which is enriched in h-BN particles relative to the initial mixture and a retentate which is enriched in BNNTs relative to the initial mixture, wherein the porous membrane comprises polytetrafluoroethylene.

10. A method for purifying a boron nitride nanotube feedstock, the method comprising the steps of:

mixing a boron nitride nanotube (BNNT) feedstock with a solvent to form an initial mixture, the BNNT feedstock comprising hexagonal boron nitride (h-BN) particles and more than 1 weight percent and less than about 50 weight percent BNNTs on a dry basis, wherein the solvent comprises a mixture of at least two solvents selected from the group consisting of are tetrahydrofuran (THF), N-methyl-2-pyrrolidone (NMP), N,N'-dimethylformamide (DMF), acetone, N,N'-dimethylacetamide (DMAc), dimethylsulfoxide (DMSO), dichloromethane (DCM), toluene, isopropanol, ethanol, and hexane;

sonicating the initial mixture within a treatment vessel using an ultrasonic probe; and filtering at least a portion of the initial mixture out of the treatment vessel and across a porous membrane at the same time as the sonication, so as to provide a filtrate which is enriched in h-BN particles relative to the initial mixture and a retentate which is enriched in BNNTs relative to the initial mixture, wherein a subatmospheric pressure is established across the membrane in order to draw filtrate across the membrane.

* * * * *